United States Patent [19]

Ruhnau et al.

[11] 4,405,982
[45] Sep. 20, 1983

[54] ARRANGEMENT FOR MONITORING THE FUNCTION OF A PROGRAMMABLE ELECTRONIC SWITCHING CIRCUIT

[75] Inventors: Gerhard Ruhnau; Klaus Grubert, both of Hanover; Karl-Heinz Hesse, Gehrden; Rudolf Auding, Hanover, all of Fed. Rep. of Germany

[73] Assignee: WABCO Fahrzeugbremsen GmbH, Hanover, Fed. Rep. of Germany

[21] Appl. No.: 198,698

[22] Filed: Oct. 20, 1980

[30] Foreign Application Priority Data

Nov. 15, 1979 [DE] Fed. Rep. of Germany ....... 2946081

[51] Int. Cl.³ .......................... G06F 9/22; G06F 9/32
[52] U.S. Cl. ..................................... 364/200; 371/62
[58] Field of Search ................... 371/12, 20, 58, 61, 371/62; 364/200, 900, 569, 143, 580; 179/2 TC, 6.31, 7.1 R; 368/118

[56] References Cited

U.S. PATENT DOCUMENTS

| | | | |
|---|---|---|---|
| 3,566,368 | 2/1971 | Blauw | 364/200 |
| 3,749,897 | 7/1973 | Hirvela | 371/62 X |
| 4,023,109 | 5/1977 | Shreve | 371/62 X |
| 4,072,852 | 2/1978 | Hogan et al. | 371/12 |
| 4,321,666 | 3/1982 | Tasar | 371/62 X |

*Primary Examiner*—James D. Thomas
*Assistant Examiner*—David Y. Eng
*Attorney, Agent, or Firm*—J. B. Sotak

[57] ABSTRACT

An arrangement for monitoring the function of a programmable electronic switching circuit, such as, a microprocessor or microcomputer, characterized by a monitoring switch is associated with and is connected with the reset input and the clear input of the programmable electronic switching circuit and the monitoring switch includes a measuring circuit for determining the program length.

2 Claims, 4 Drawing Figures

ARRANGEMENT FOR MONITORING THE FUNCTION OF A PROGRAMMABLE ELECTRONIC SWITCHING CIRCUIT

FIELD OF THE INVENTION

The invention relates to an arrangement for monitoring the function of programmable electronic control circuits, and more particularly to microprocessors and microcomputers in which the length of program is monitored in order to verify that the program is not erroneously lengthened and/or shortened during the processing operation.

BACKGROUND OF THE INVENTION

It has been found that interference or noise signals in power supplies for the switching or control circuits can lead to the program counter and storage register of a microprocessor or microcomputer being changed in such a way that the program present in the constant value storage no longer can be processed properly and only arbitrary operations can be carried out. This condition can only be remedied by a reset function, that is, by resetting of the microcomputer or microprocessor to the initial condition with the subsequent restart of the program.

It is conceivable in the case of microprocessors to check the data circuits for the occurrence of erroneous operations and to take certain measures during the existence of such operations which will result in the restarting of the program.

However, this method requires extensive decoding switching circuitry to recognize faulty operations, and further it cannot be used for microcomputers, since with these the data circuits are not readily accessible externally.

OBJECTS OF THE INVENTION

Accordingly, it is an object of this invention to provide a new and improved electronic circuit arrangement for monitoring the length of a computer program.

A further object of this invention is to provide an arrangement for monitoring the functional length of a program comprising a programmable electronic control circuit having reset and clear terminals, a monitoring switching circuit including an output terminal which is connected to the reset terminal of the programmable electronic control circuit, the clear terminal of the programmable electronic control circuit is connected to an input terminal of the monitoring switching circuit for causing a time measurement which is utilized to determine the length of the program.

SUMMARY OF THE INVENTION

The basis for the monitoring arrangements according to the invention is that a clear signal is generated by a microprocessor or microcomputer after every run-through of its program. The clear signal sets the content of a counter back to the value zero. Thus, the counter is timed with a fixed frequency, that is, to say it counts upward at a constant speed. If now the microprocessor or microcomputer goes out of order in such a way that it can no longer process the intended useful program, then the clear signal is no longer produced, and the counter reaches a counting position which is not possible with the normal sequence frequency of the clear signal. This erroneous counting position is evaluated by the arrangements according to the invention, in order to recognize the error, to set the microprocessor or microcomputer back into the initial state and to initiate the restart of the program again.

BRIEF DESCRIPTION OF THE DRAWINGS

The drawings show three examples of the invention in the form of block diagrams.

DETAILED DESCRIPTION OF THE INVENTION

Figure 1:
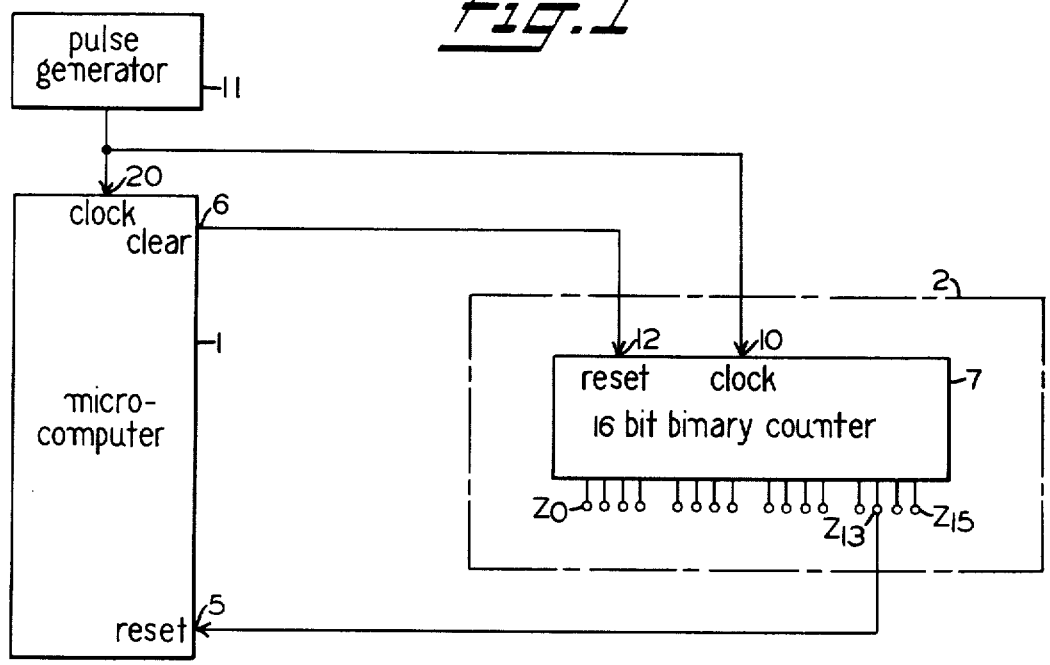
FIG. 1 shows a circuit arrangement for monitoring of the program for a permissible maximum period of time by means of a binary counter.

Referring now to the drawings and in particular to FIG. 1, there is illustrated a circuit block diagram of one embodiment of the present invention. As shown, the functional operation of a microcomputer or microprocessor 1 is monitored by a control switching circuit 2 which includes a sixteen (16) bit binary counter 7. A timing generator or clock source 11 is connected to the respective clock input terminals 10 and 20 of binary counter 7 and microcomputer 1. The clear output terminal 6 of the microcomputer 1 is connected to the reset input terminal of the binary counter 7. It will be noted that one of the outputs, namely, terminal $Z_{13}$ of the sixteen output terminals $Z_0$–$Z_{15}$ of binary counter 7 is connected to the reset input terminal 5 of the microcomputer 1.

In describing the operation of the circuit of FIG. 1, it will be appreciated that microprocessor or microcomputer 1 is checked and monitored by means of hard wired switching logic, namely, Random logic. It will be assumed that the programmed microcomputer 1 has the following operating characteristics:

Mean program period, TP = 1.7 msec.
Maximum program period, $TP_{max}$ = 1.8 sec.
Minimum program period, $TP_{min}$ = 1.6 msec.
Clock frequency, FZ = 4.4 Mhz.

Now if the microcomputer 1 takes too long of a period of time to run through its program, then it is advisable to generate an error message which may have a maximum numerical value $ZW_{max}$, where, $ZW_{max}$ = $TP_{max}$ × FZ,
$ZW_{max}$ = 1.8 msec. × 4.4 Mhz.
$ZW_{max}$ = 7,920.

The switching operation of the circuit of FIG. 1 takes place in the following manner.

The timing generator 1 conveys clock pulses to the input 20 of microcomputer 1 as well as to the input 10 of the sixteen (16) bit binary counter 7. It will be appreciated that a clear signal having a frequency of (1/TP) should be conveyed to the reset input 12 of binary counter 7 from the clear output 6 of the microcomputer 1. However, if a clear signal is not developed within a prescribed period of time, then the binary counter 7 will reach a count which exceeds the above calculated numerical value ZW of 7,920. That is, if the binary counter 7 is allowed to count up to a point where an output appears on the terminal $Z_{13}$ which is equivalent to $2^{13}$, namely, 8,192, then a reset signal is applied to the input terminal 5 of the microcomputer 1. Thus, the output terminal $Z_{13}$ of the binary counter 7 goes from a logical "0" to a logical "1" when the program of the microcomputer 1 runs for too long of a time. It will be appreciated that the logical "1" on output terminal $Z_{13}$ is applied to the input reset terminal 5 of the microcomputer 1. Further, the output terminal $Z_{13}$ will remain a logical "1" only for a finite period of time, namely, $t_1$, where, $t_1 = 8,192/FZ$;
$t_1 = 8,192/4.41$ Mhz.
$t_1 = 1.862$ msec.

which is also the time that the reset pulse is applied to input terminal 5 of microcomputer 1. After the elapse of time $t_1$, the output terminal $Z_{13}$ of counter 7 reverts to a logical "0" for a period of time, namely, $t_0$, where, $t_0 = 8,192/FZ$;
$t_0 = 8,192/4.4$ Mhz.
$t_0 = 1.862$ msec.

Simultaneously with the termination of time $t_1$, the normal computer program is initiated, and if no noise or disturbances occur during the program processing, a clear signal is developed on output terminal 5 of microcomputer 1 at the end of the program period. The clear signal is conveyed to the input terminal 12 to reset the binary counter 7. That is, the counter 7 is not permitted to reach the point where the output terminal is $Z_{13}$, namely, a count of 8,192.

Figure 2:
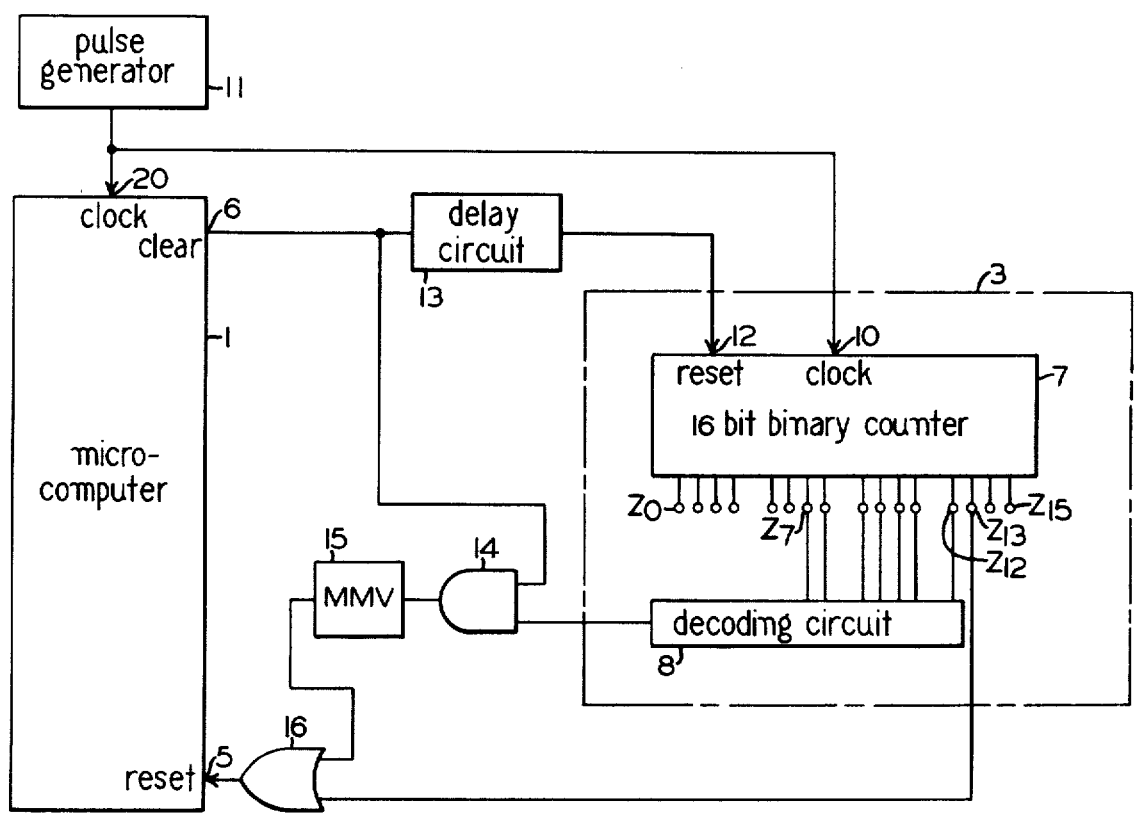
FIG. 2 shows a circuit arrangement for monitoring of the program for a minimum and a maximum period of time with a binary counter and a connected decoder.

Referring now to FIG. 2, there is shown another embodiment of the invention which is modified to perform the additional function of causing a reset signal to be produced if a clear signal is developed before a certain minimum value $ZP_{min}$ is reached by the microcomputer 1. As shown, a delay circuit 13 is interconnected between the clear output terminal 6 of the microcomputer 1 and the reset input terminal 12 of the binary counter 7. It will be noted that the output terminals $Z_7$ through $Z_{12}$ are connected to the input of a decoding circuit 8. The output of the decoding circuit 8 is connected to one input of a two-input AND gate 14. The other input of the AND gate 14 is connected to the clear output terminal 6 of the microcomputer 1. The output of the AND gate 14 is connected to the trigger input of the monostable multivibrator (MMV) 15. The output of the monostable multivibrator 15 is connected to one input of the two-input OR gate 16 while the other input of the OR gate 16 is connected to the output terminal $Z_{13}$ of the binary counter 7. The output of the OR gate 16 is connected to the reset input terminal 5 of the microcomputer 1.

It will be appreciated that if the clear signal is produced on output terminal 6 before the expiration of the minimum program period $TP_{min}$ then a reset signal is produced on terminal 5. Thus, an erroneous program period is indicated when a clear signal is developed too early.

In practice, a reset signal is generated by a monitoring switching circuit when a clear signal is developed on terminal 6 even though the binary counter 7 has not reached a selected minimun value $ZW_{min}$ where, $ZW = TP_{min} \times FZ$,
$ZW = 1.6$ msec. $\times 4.4$ Mhz.
$ZW = 7,040$.

In FIG. 2, the output terminals $Z_7$ to $Z_{12}$ of the binary counter 7 are connected to the decoding circuit 8 in order to establish the minimum count number $ZW$ of 7,040. It will be understood that as long as the count of the binary counter 7 remains smaller than the minimum value $ZW$, the output level of the decoding circuit is high, namely, a logical "1". Thus, the one input of the two-input AND gate 14 is at a logical "1". Now if a clear signal is produced on terminal 6 of microcomputer 1, the other input of the AND gate becomes high so that a positive output signal is produced by the AND gate 14. The positive output signal triggers the monostable multivibrator 15 and causes it to produce an output pulse of a given duration. Thus, the OR gate is turned on to cause a logical "1" to be applied to reset terminal 5 of microcomputer 1. It will be appreciated that the duration of the reset pulse is dependent upon functional operation and the type of program employed by the particular microcomputer or microprocessor.

The delay circuit 13 is interposed between the clear terminal of the microcomputer 6 and the reset terminal 12 of the binary counter 7 in order to ensure that the decoding circuit 8 will respond to the condition or count of the binary counter 7 and will convey an appropriate signal to the AND gate 14 before it is reset by a clear signal.

If the clear signal is developed after the maximum value $ZW_{max}$, 7,920, then the switching circuit functions in the exact manner as that previously described in relation to FIG. 1.

It has been found that since the above-described switching arrangement requires very little effort to implement, and that it can be quickly integrated without great difficulty to perform a tributary function in a switching system for specific purposes, such as, for the input switching circuit for an anti-skid protection system for vehicle brakes.

Figure 3:
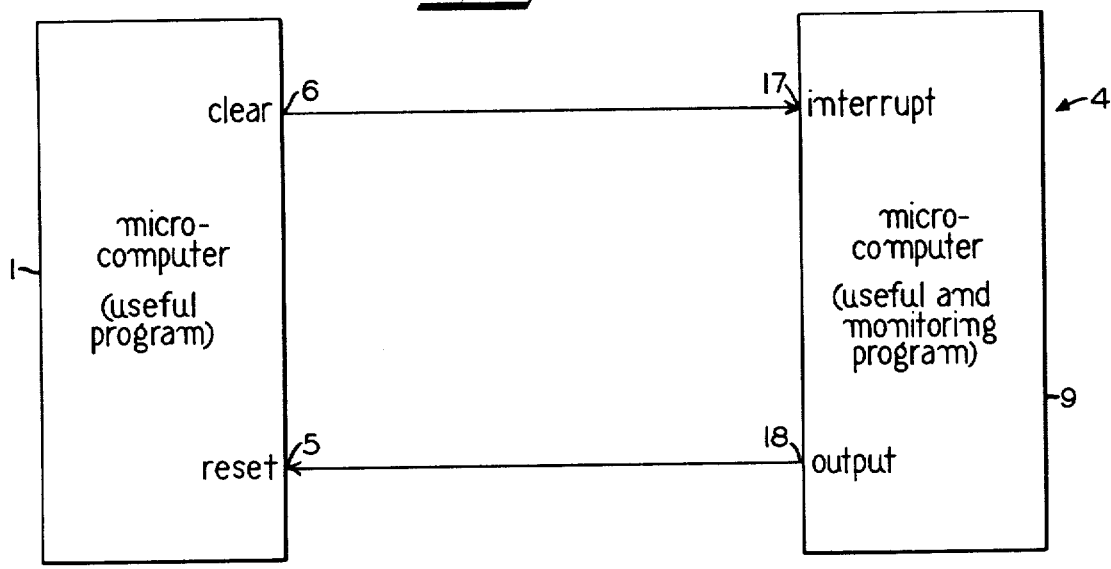
FIG. 3 shows the program of one microcomputer as being monitored by another microcomputer.
Figure 4:
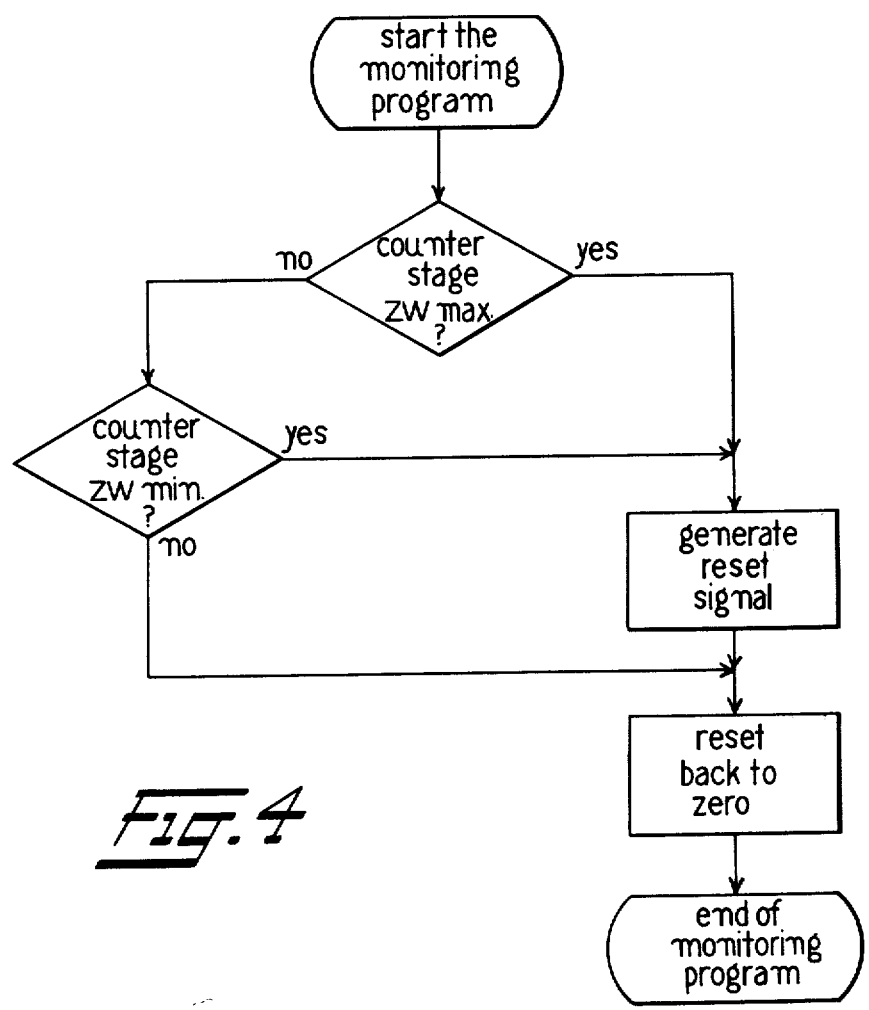
FIG. 4 is a flow chart showing the graphic representation of the data processing by the microcomputer.

Referring now to FIG. 3, there is shown another switching variation of the subject invention. As shown, the useful program of microcomputer 1 is monitored by a monitoring microcomputer 9. The clear output terminal of microcomputer 1 is connected to the interrupt input terminal 17 of microcomputer 9 while the output terminal 18 of microcomputer 9 is connected to the reset input terminal 5 of microcomputer 1. In operation, the appearance of a clear signal causes the initiation of the useful and monitoring program of microcomputer 9. Now let us refer to the flow chart of FIG. 4 which graphically illustrates the data processing steps of the monitoring program. This program analyzes and determines whether the sequential frequency or periodicity of the clear signals is located within the preselected permissible range. It will be seen that if the maximum value $ZW_{max}$ is exceeded or if the minimum value $ZW_{min}$ is not surpassed, then a reset signal is applied to the input terminal 5 of microcomputer 1 from output terminal 18 by monitoring microcomputer 9. Thus, the microcomputer 1 is reset to its initial or original state. That is, the useful program of microcomputer 1 is started anew.

It will be appreciated that the register of the monitoring microcomputer 9 operates as a counter which is incrementally controlled by a constant frequency or clock pulse developed by a time interrupted program. The use of the second microcomputer 9 for monitoring the first microcomputer 1 is especially conducive when an ancillary computer is available for providing the necessary switching function.

It will be understood that various changes and modifications of the present invention may be made by those skilled in the art without departing from the spirit and scope of the invention and, therefore, it is obvious that these variations, alterations, or equivalents are herein meant to be encompassed in the appended claims.

Having now described the invention, what we claim as new and desire to secure by Letters Patent, is:

1. An arrangement for monitoring the normal time required to execute a program comprising, a programmable electronic control circuit for processing the program and having reset and clear terminals, a monitoring switching circuit for monitoring the time of the program, circuit electronic control circuit, said monitoring switching circuit includes a decoding circuit having a plurality of inputs, a pulse generator, said monitoring switching circuit includes a binary counter having a clock input and a plurality of outputs, means connecting said clock input to said pulse generator, means connecting said plurality of binary counter outputs to said plurality of inputs of said decoding circuit, a delay circuit, means connecting said delay circuit between a reset terminal of said binary counter and said clear terminal of said programmable electronic control circuit, an AND gate, means connecting an output of said decoding circuit and said clear terminal of said programmable electronic control circuit to said AND gate, a monostable multivibrator having an input, means connecting said input of said monostable multivibrator to the output of said AND gate, a two-input OR gate, means connecting the output of the monostable multivibrator and the output of said binary counter which correspond to the maximum program period to the respective inputs of said OR gate, means connecting the output of the OR gate to said reset terminal of said programmable electronic control circuit, said programmable electronic control circuit having a clock input, and means connecting said clock input of said programmable electronic control circuit to said pulse generator for correlating a pulse count and for causing said binary counter to provide a pulse on said reset terminal of said programmable electronic control circuit when the normal time of the program is incorrect.

2. The arrangement according to claim 6, wherein said programmable electronic control circuit is a first microcomputer, and said monitoring switching circuit includes a second microcomputer, means connecting said second microcomputer to said first microcomputer whereby said second microcomputer monitors the normal time of the program of said first microcomputer.

* * * * *

UNITED STATES PATENT AND TRADEMARK OFFICE
CERTIFICATE OF CORRECTION

PATENT NO. : 4,405,982
DATED : September 20, 1983
INVENTOR(S) : Gerhard Ruhnau, Klaus Grubert, Karl-Heinz Hesse & Rudolf Auding It is certified that error appears in the above-identified patent and that said Letters Patent are hereby corrected as shown below:

Column 5, line 10, delete "circuit electronic control circuit,"

Column 6, line 17, delete "6" and insert --1--

Signed and Sealed this

Twentieth Day of March 1984

[SEAL]

Attest:

GERALD J. MOSSINGHOFF

*Attesting Officer*

*Commissioner of Patents and Trademarks*